US012695524B2

(12) United States Patent (10) Patent No.: US 12,695,524 B2
Yang et al. (45) Date of Patent: Jul. 28, 2026

(54) METHOD FOR DETERMINING QUANTITY OF PASSIVE INTERMODULATION SOURCE AND RELATED DEVICE

(71) Applicant: HUAWEI TECHNOLOGIES CO., LTD., Shenzhen (CN)

(72) Inventors: Zhi Yang, Shenzhen (CN); Qiang Huo, Moscow (RU); Yanqing Zhu, Xi'an (CN); Zhiqiang Zou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 18/505,205

(22) Filed: Nov. 9, 2023

(65) Prior Publication Data

US 2024/0080116 A1 Mar. 7, 2024

Related U.S. Application Data

(63) Continuation of application No. PCT/CN2022/091456, filed on May 7, 2022.

(30) Foreign Application Priority Data

Jun. 28, 2021 (CN) .......................... 202110723293.6

(51) Int. Cl.
*H04B 17/345* (2015.01)
*H04B 17/20* (2015.01)

(52) U.S. Cl.
CPC ......... *H04B 17/345* (2015.01); *H04B 17/204* (2023.05)

(58) Field of Classification Search
CPC ...... H04B 17/00; H04B 17/20; H04B 17/201; H04B 17/204; H04B 17/29; H04B 17/297; H04B 17/345; H04B 17/346; H04W 24/00; H04W 24/06; H04W 24/08; G01R 29/0814; G01R 31/2822
See application file for complete search history.

(56) References Cited

U.S. PATENT DOCUMENTS

| | | | |
|---|---|---|---|
| 2013/0182753 A1 | 7/2013 | Delforce et al. | |
| 2014/0146866 A1 | 5/2014 | Strachan et al. | |
| 2016/0366605 A1* | 12/2016 | Tsui ...................... | H04W 24/08 |

(Continued)

OTHER PUBLICATIONS

Extended European Search Report issued in corresponding European Application No. 22831436.5, dated Aug. 22, 2024, pp. 1-9.

*Primary Examiner* — Quochien B Vuong
(74) *Attorney, Agent, or Firm* — HAUPTMAN HAM, LLP

(57) ABSTRACT

A method for determining a quantity of passive inter-modulation sources. A quantity of passive inter-modulation sources of a multi-antenna device is obtained. An interference signal that is excited by a sounding signal and that is from a passive inter-modulation source is received. Singular value decomposition is performed on a first matrix corresponding to the interference signal. A quantity of passive inter-modulation sources is determined based on a result of the singular value decomposition. In this way, the quantity of passive inter-modulation sources of the multi-antenna device is directly determined by performing operations including signal receiving and sending and calculation of the multi-antenna device, to implement convenient, accurate, and secure detection of information about the quantity of the passive inter-modulation sources of the multi-antenna device.

20 Claims, 7 Drawing Sheets

(56)          References Cited

U.S. PATENT DOCUMENTS

2018/0081047 A1*    3/2018  Gander ............. H04B 17/0085
2018/0088161 A1*    3/2018  Bell ..................... H04W 24/06
2020/0244564 A1*    7/2020  Naseef ................. H04W 16/28

* cited by examiner

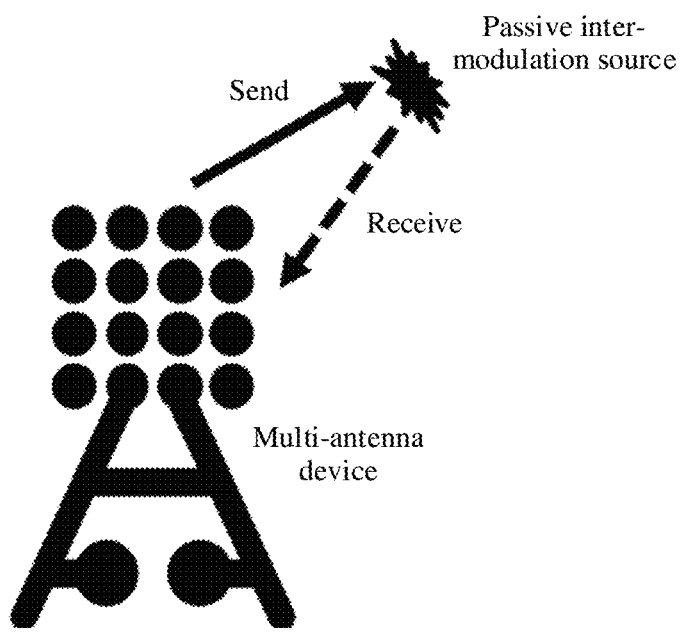

Passive inter-modulation source

Send

Receive

Multi-antenna device

FIG. 1

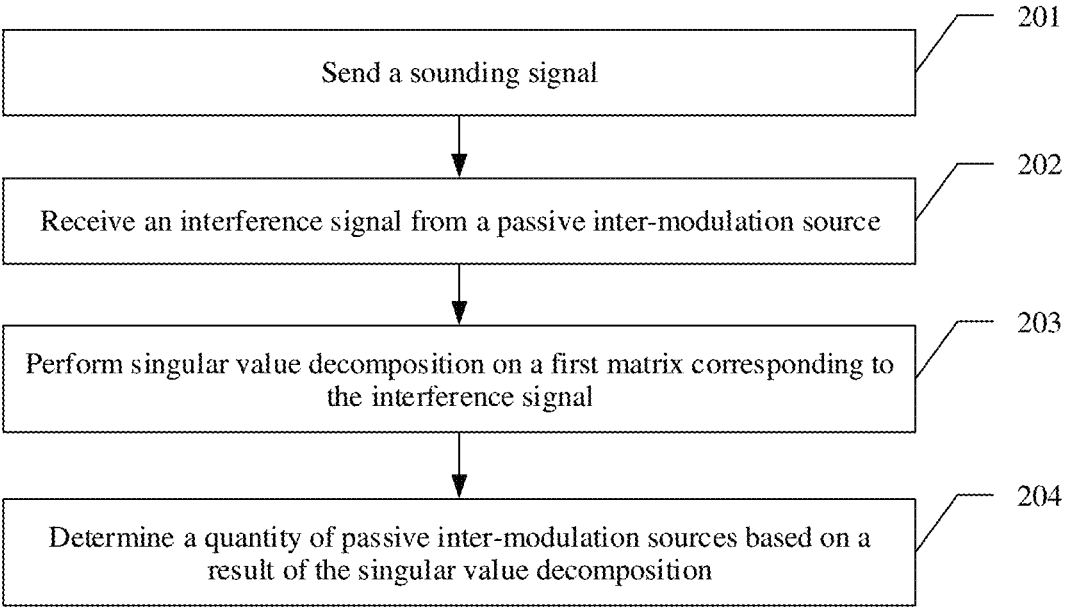

Send a sounding signal — 201

Receive an interference signal from a passive inter-modulation source — 202

Perform singular value decomposition on a first matrix corresponding to the interference signal — 203

Determine a quantity of passive inter-modulation sources based on a result of the singular value decomposition — 204

FIG. 2

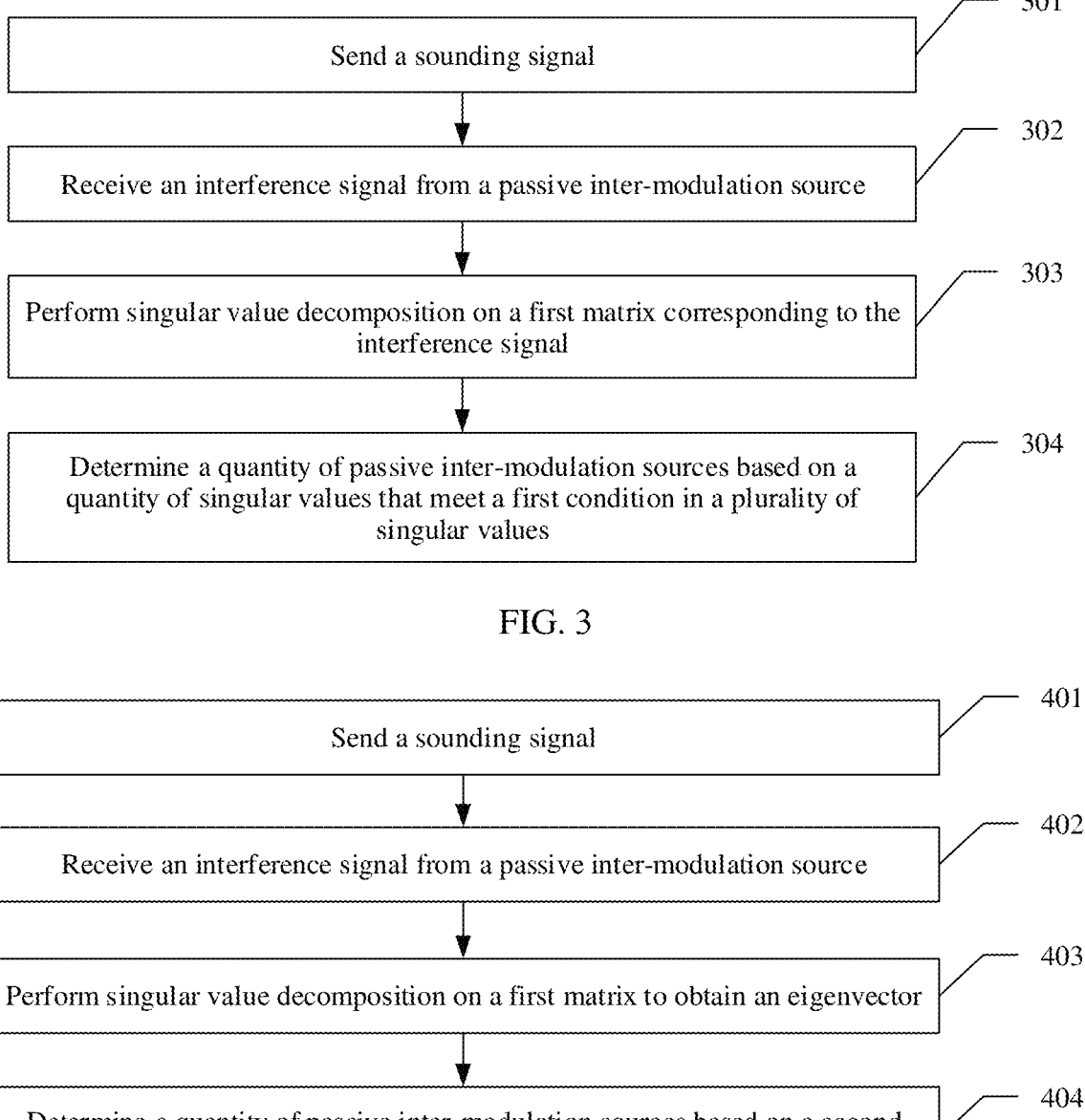

301

Send a sounding signal

302

Receive an interference signal from a passive inter-modulation source

303

Perform singular value decomposition on a first matrix corresponding to the interference signal

304

Determine a quantity of passive inter-modulation sources based on a quantity of singular values that meet a first condition in a plurality of singular values

Send a sounding signal

402

Receive an interference signal from a passive inter-modulation source

403

Perform singular value decomposition on a first matrix to obtain an eigenvector

404

Determine a quantity of passive inter-modulation sources based on a second matrix and the eigenvector

FIG. 4

Dual
polarization

+45°
polarization

-45°
polarization

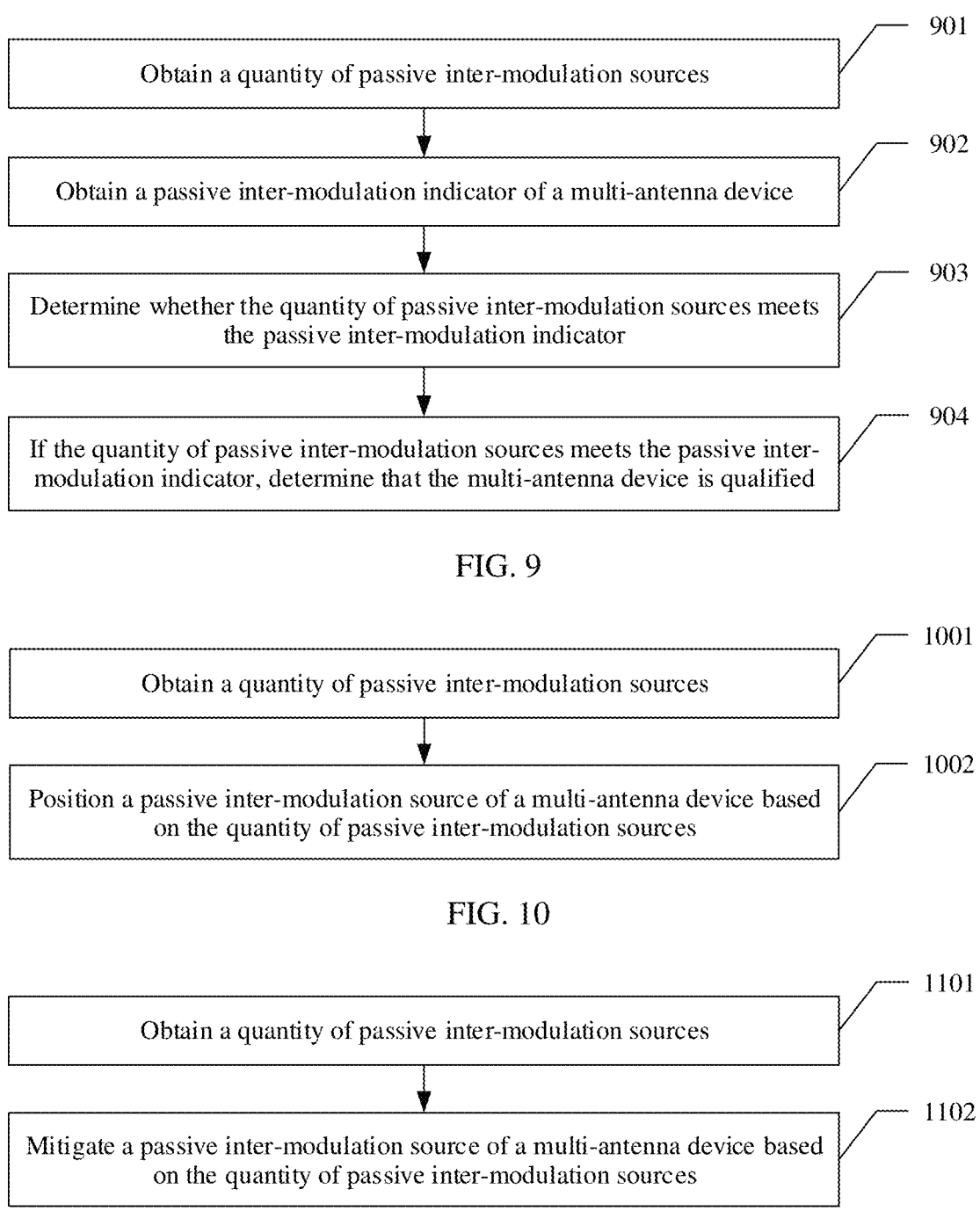

901

Obtain a quantity of passive inter-modulation sources

902

Obtain a passive inter-modulation indicator of a multi-antenna device

903

Determine whether the quantity of passive inter-modulation sources meets the passive inter-modulation indicator

904

If the quantity of passive inter-modulation sources meets the passive inter-modulation indicator, determine that the multi-antenna device is qualified

Obtain a quantity of passive inter-modulation sources

1002

Position a passive inter-modulation source of a multi-antenna device based on the quantity of passive inter-modulation sources

Obtain a quantity of passive inter-modulation sources

1102

Mitigate a passive inter-modulation source of a multi-antenna device based on the quantity of passive inter-modulation sources

FIG. 11

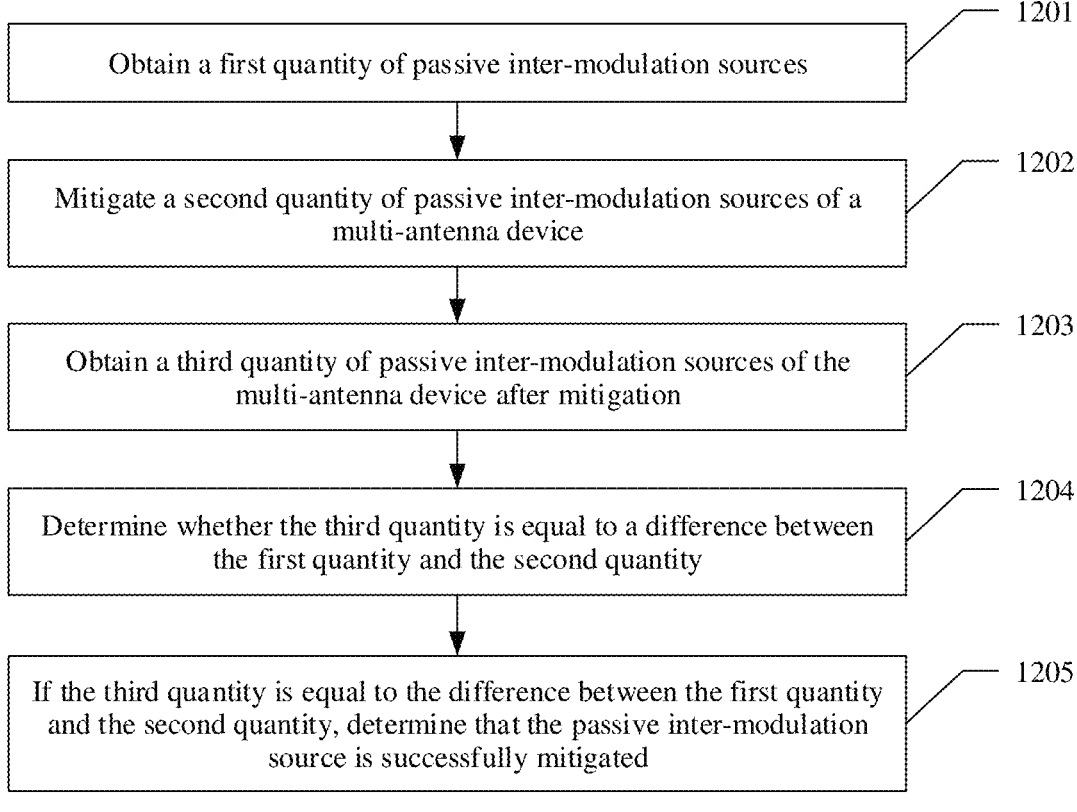

Obtain a first quantity of passive inter-modulation sources — 1201

Mitigate a second quantity of passive inter-modulation sources of a multi-antenna device — 1202

Obtain a third quantity of passive inter-modulation sources of the multi-antenna device after mitigation — 1203

Determine whether the third quantity is equal to a difference between the first quantity and the second quantity — 1204

If the third quantity is equal to the difference between the first quantity and the second quantity, determine that the passive inter-modulation source is successfully mitigated — 1205

FIG. 12

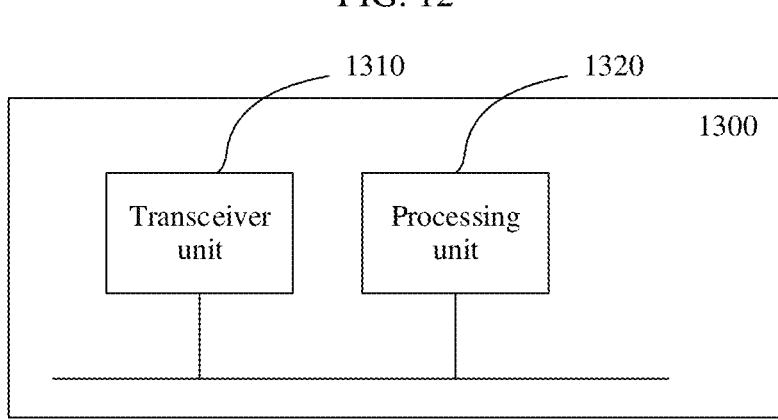

1310    1320

1300

Transceiver unit

Processing unit

FIG. 13

METHOD FOR DETERMINING QUANTITY OF PASSIVE INTERMODULATION SOURCE AND RELATED DEVICE

CROSS-REFERENCE TO RELATED APPLICATIONS

This application is a continuation of International Application No. PCT/CN2022/091456, filed on May 7, 2022, which claims priority to Chinese Patent Application No. 202110723293.6, filed on Jun. 28, 2021. The disclosures of the aforementioned applications are hereby incorporated by reference in their entireties.

BACKGROUND

A nonlinear interference source is an important factor that limits a capacity of a communication system. Passive inter-modulation (passive inter-modulation, PIM) interference is a typical type of nonlinear interference.

In a production line, a passive inter-modulation indicator has become an important indicator of product quality, and information about a quantity of passive inter-modulation sources is an important factor in determining whether the product is qualified. To obtain the information about a quantity of passive inter-modulation sources, a near-field scanning method is used. Specifically, after a to-be-detected device is started, a passive inter-modulation signal appears. After a passive inter-modulation frequency is known, a receiving frequency of a probe is adjusted to the passive inter-modulation frequency. The device is scanned by the probe closely. After the probe receives the passive inter-modulation signal, the quantity of passive inter-modulation sources is obtained by analyzing power or a phase of the passive inter-modulation signal.

However, to use the near-field scanning method, a worker uses an external device. In response to the to-be-detected device being of a closed structure, for example, a cable and a cavity filter, placing the external device to approach the to-be-detected device is difficult, and the external device is also likely to become a passive inter-modulation source. In addition, the to-be-detected device is used in a high-power scenario, and the worker is exposed to a strong radiation environment which also affects health of the worker. Therefore, how to conveniently, accurately, and securely detect information about a quantity of multi-channel passive inter-modulation sources becomes an urgent problem to be resolved currently.

SUMMARY

Embodiments described herein provide a method for determining a quantity of passive inter-modulation sources and a related device, to conveniently, accurately, and securely detect information about a quantity of passive inter-modulation sources of a multi-antenna device. Embodiments described herein further provide a corresponding apparatus, a communication apparatus, a computer-readable storage medium, a chip system, and a computer program product.

A first aspect of at least one embodiment provides a method for determining a quantity of passive inter-modulation sources. The method is performed by a multi-antenna device, or is performed by a communication antenna, a processor, a chip, or a chip system of the multi-antenna device, or is implemented by a logic module or software that implements all or some communication functions, control functions, and calculation functions. For example, the method is performed by the multi-antenna device, and the method includes:

sending a sounding signal; receiving an interference signal from a passive inter-modulation source, where the interference signal is excited by the sounding signal; performing singular value decomposition on a first matrix corresponding to the interference signal; and determining a quantity of passive inter-modulation sources based on a result of the singular value decomposition.

In at least one embodiment, the first matrix is a matrix corresponding to the interference signal, or is a covariance matrix of the matrix corresponding to the interference signal, and eigenvalue decomposition is further performed on the first matrix. The multi-antenna device determines the quantity of passive inter-modulation sources based on a value change trend of a plurality of singular values. In response to values of the plurality of singular values jumping, a quantity of jumped singular values is determined as the quantity of passive inter-modulation sources.

In at least one embodiment, the multi-antenna device is controlled to transmit a sounding signal used to excite passive inter-modulation, so that the multi-antenna device receives an interference signal generated based on the sounding signal. Then, the singular value decomposition is performed on the first matrix corresponding to the interference signal. The quantity of passive inter-modulation sources is determined based on the result of the singular value decomposition. In this way, not only information about a quantity of multi-channel passive inter-modulation sources is detected, but also no external device is used, thereby avoiding generation of an additional passive inter-modulation source. No problem is caused even in response to the multi-antenna device being of a closed structure or is used in a high-power scenario, thereby implementing convenient, accurate, and secure detection of the information about the quantity of the multi-channel passive inter-modulation sources.

Optionally, the result of the singular value decomposition includes a plurality of singular values. The foregoing step of the determining a quantity of passive inter-modulation sources based on a result of the singular value decomposition specifically includes: determining the quantity of passive inter-modulation sources based on a quantity of singular values that meet a first condition in the plurality of singular values.

In at least one embodiment, a user presets the first condition, so that the multi-antenna device directly determines the quantity of singular values that meet the first condition, thereby determining the quantity of passive inter-modulation sources. This improves implementability of at least one embodiment.

Optionally, the foregoing step of the determining the quantity of passive inter-modulation sources based on a quantity of singular values that meet a first condition in the plurality of singular values specifically includes: determining a quantity N of singular values that meet the first condition in the plurality of singular values as the quantity of passive inter-modulation sources, where the singular values that meet the first condition are greater than a first preset threshold, and the quantity N is an integer greater than or equal to 0.

In at least one embodiment, the user presets the first condition to be greater than the first preset threshold, so that the multi-antenna device directly determines the quantity N of singular values that meet the first condition, thereby determining the quantity of passive inter-modulation sources. This improves implementability of at least one embodiment.

Optionally, the interference signal includes a noise signal, and the first preset threshold is related to noise power of the noise signal.

In at least one embodiment, the multi-antenna device determines the first preset threshold based on the received noise signal, so that interference from the noise signal is eliminated, and a passive inter-modulation source whose power is lower than that of the noise signal is not considered. This meets a user use case while improving implementability of at least one embodiment.

Optionally, the first matrix is a matrix or a covariance matrix corresponding to some interference signals in interference signals. The foregoing step of the performing singular value decomposition on a first matrix corresponding to the interference signal specifically includes: performing the singular value decomposition on the first matrix to obtain an eigenvector. The determining a quantity of passive inter-modulation sources based on a result of the singular value decomposition includes: determining the quantity of passive inter-modulation sources based on a second matrix and the eigenvector, where the second matrix is a matrix or a covariance matrix corresponding to an interference signal other than the some interference signals in the interference signals.

In at least one embodiment, the multi-antenna device further divides the interference signal into two parts to determine the quantity of passive inter-modulation sources. This improves implementability of the at least one embodiment.

Optionally, the foregoing step of the determining the quantity of passive inter-modulation sources based on a second matrix and the eigenvector specifically includes: determining a plurality of values based on the second matrix and the eigenvector; and determining the quantity of passive inter-modulation sources based on a quantity of values that meet a second condition in the plurality of values.

In at least one embodiment, the multi-antenna device projects the second matrix on the eigenvector to obtain the plurality of values. A user presets the second condition, so that the multi-antenna device directly determines a quantity of singular values that meet the second condition, thereby determining the quantity of passive inter-modulation sources. This improves implementability of at least one embodiment.

Optionally, the foregoing step of the determining the quantity of passive inter-modulation sources based on a quantity of values that meet a second condition in the plurality of values specifically includes: determining a quantity M of values that meet the second condition in the plurality of values as the quantity of passive inter-modulation sources, where the values that meet the second condition are greater than a second preset threshold, and the quantity M is an integer greater than or equal to 0.

In at least one embodiment, the user presets the second condition to be greater than the second preset threshold, so that the multi-antenna device directly determines the quantity M of values that meet the second condition, thereby determining the quantity of passive inter-modulation sources. This improves implementability of at least one embodiment.

Optionally, the interference signal includes a noise signal, and the second preset threshold is related to noise power of the noise signal.

In at least one embodiment, the multi-antenna device determines the second preset threshold based on the received noise signal, so that interference from the noise signal is eliminated, and a passive inter-modulation source whose power is lower than that of the noise signal is not considered. This meets a user use case while improving implementability of at least one embodiment.

A second aspect of at least one embodiment provides a method for determining a quantity of passive inter-modulation sources. The method is performed by a multi-antenna device, or is performed by a communication antenna, a processor, a chip, or a chip system of the multi-antenna device, or is implemented by a logic module or software that implements all or some communication functions, control functions, and calculation functions. For example, the method is performed by the multi-antenna device, and the method includes:

sending a sounding signal; receiving an interference signal from a passive inter-modulation source; grouping antennas that receive the interference signal to obtain a plurality of groups of antennas; determining a peak power set of receiving power of each group of antennas for receiving the interference signal; and determining the quantity of passive inter-modulation sources based on the peak power set.

In at least one embodiment, the multi-antenna device is controlled to transmit a sounding signal used to excite passive inter-modulation, so that the multi-antenna device receives an interference signal generated based on the sounding signal. Then, the antennas that receive the interference signal are grouped. After the peak power set of the receiving power of each group of the antennas for receiving the interference signal is determined, the quantity of passive inter-modulation sources is determined based on the peak power set. In this way, not only information about a quantity of multi-channel passive inter-modulation sources is detected, but also no external device is used, thereby avoiding generation of an additional passive inter-modulation source. No problem is caused even in response to the multi-antenna device being a closed structure or being used in a high-power scenario, thereby implementing convenient, accurate, and secure detection of the information about the quantity of the multi-channel passive inter-modulation sources.

A third aspect of at least one embodiment provides a method for inspecting a multi-antenna device. The method is performed by a multi-antenna device, or is performed by a communication antenna, a processor, a chip, or a chip system of the multi-antenna device, or is implemented by a logic module or software that implements all or some communication functions, control functions, and calculation functions. For example, the method is performed by the multi-antenna device, and the method includes:

obtaining a quantity of passive inter-modulation sources; obtaining a passive inter-modulation indicator of the multi-antenna device; determining whether the quantity of passive inter-modulation sources meets the passive inter-modulation indicator; and in response to the quantity of passive inter-modulation sources meeting the passive inter-modulation indicator, determining that the multi-antenna device is qualified.

In at least one embodiment, the multi-antenna device obtains the quantity of passive inter-modulation sources according to the method in the first aspect or at least one embodiment of the first aspect. A delivery inspection on the multi-antenna device is performed based on the quantity of passive inter-modulation sources, so that the passive intermodulation indicator of the multi-antenna device is conveniently, accurately, and securely inspected.

A fourth aspect of at least one embodiment provides a method for positioning a passive inter-modulation source. The method is performed by a multi-antenna device, or is performed by a communication antenna, a processor, a chip, or a chip system of the multi-antenna device, or is implemented by a logic module or software that implements all or some communication functions, control functions, and calculation functions. For example, the method is performed by the multi-antenna device, and the method includes:

obtaining a quantity of passive inter-modulation sources; and positioning a passive inter-modulation source of the multi-antenna device based on the quantity of passive inter-modulation sources.

In at least one embodiment, the multi-antenna device obtains the quantity of passive inter-modulation sources according to the method in the first aspect or at least one embodiment of the first aspect. Passive inter-modulation source positioning on the multi-antenna device is performed based on the quantity of passive inter-modulation sources, so that the passive inter-modulation source of the multi-antenna device is conveniently, accurately, and securely positioned.

A fifth aspect of at least one embodiment provides a method for mitigating a passive inter-modulation source. The method is performed by a multi-antenna device, or is performed by a communication antenna, a processor, a chip, or a chip system of the multi-antenna device, or is implemented by a logic module or software that implements all or some communication functions, control functions, and calculation functions. For example, the method is performed by the multi-antenna device, and the method includes:

obtaining a quantity of passive inter-modulation sources; and mitigating a passive inter-modulation source of the multi-antenna device based on the quantity of passive inter-modulation sources.

In at least one embodiment, the multi-antenna device obtains the quantity of passive inter-modulation sources according to the method in the first aspect or at least one embodiment of the first aspect. Passive inter-modulation source mitigation on the multi-antenna device is performed based on the quantity of passive inter-modulation sources, so that the passive inter-modulation source of the multi-antenna device is conveniently, accurately, and securely mitigated.

A sixth aspect of at least one embodiment provides an inspection method for mitigating a passive inter-modulation source. The method is performed by a multi-antenna device, or is performed by a communication antenna, a processor, a chip, or a chip system of the multi-antenna device, or is implemented by a logic module or software that implements all or some communication functions, control functions, and calculation functions. For example, the method is performed by the multi-antenna device, and the method includes:

obtaining a first quantity of passive inter-modulation sources; mitigating a second quantity of passive inter-modulation sources of the multi-antenna device; obtaining a third quantity of passive inter-modulation sources of the multi-antenna device after mitigation; determining whether the third quantity is equal to a difference between the first quantity and the second quantity; and in response to the third quantity being equal to the difference between the first quantity and the second quantity, determining that the passive inter-modulation sources are successfully mitigated.

In at least one embodiment, the multi-antenna device obtains the quantity of passive inter-modulation sources according to the method in the first aspect or at least one embodiment of the first aspect. Passive inter-modulation source inspection for mitigation on the multi-antenna device is performed based on the quantity of passive inter-modulation sources, so that effect of mitigating the passive inter-modulation sources of the multi-antenna device is conveniently, accurately, and securely inspected.

A seventh aspect of at least one embodiment provides an apparatus for determining a quantity of passive inter-modulation sources, and the apparatus is configured to perform the method in the first aspect or at least one embodiment of the first aspect. Specifically, the apparatus for determining a quantity of passive inter-modulation sources includes modules or units configured to perform the method in the first aspect or at least one embodiment of the first aspect, for example, a transceiver unit and a processing unit.

The transceiver unit is configured to send a sounding signal. The transceiver unit is further configured to receive an interference signal from a passive inter-modulation source, and the interference signal is excited by the sounding signal. The processing unit is configured to perform singular value decomposition on a first matrix corresponding to the interference signal, where the processing unit is further configured to determine a quantity of passive inter-modulation sources based on a result of the singular value decomposition.

Optionally, the result of the singular value decomposition includes a plurality of singular values, and the processing unit is specifically configured to determine the quantity of passive inter-modulation sources based on a quantity of singular values that meet a first condition in the plurality of singular values.

Optionally, the processing unit is further specifically configured to determine a quantity N of singular values that meet the first condition in the plurality of singular values as the quantity of passive inter-modulation sources, the singular values that meet the first condition are greater than a first preset threshold, and the quantity N is an integer greater than or equal to 0.

Optionally, the interference signal includes a noise signal, and a preset threshold is generated based on noise power of the noise signal.

Optionally, the first matrix is a matrix or a covariance matrix corresponding to some interference signals in interference signals, and the processing unit is further specifically configured to perform singular value decomposition on the first matrix to obtain an eigenvector. The processing unit is further specifically configured to determine the quantity of passive inter-modulation sources based on a second matrix and the eigenvector, and the second matrix is a matrix or a covariance matrix corresponding to an interference signal other than the some interference signals in the interference signals.

Optionally, the processing unit is further specifically configured to determine a plurality of values based on the second matrix and the eigenvector. The processing unit is further specifically configured to determine the quantity of passive inter-modulation sources based on a quantity of values that meet the second condition in the plurality of values.

Optionally, the processing unit is further specifically configured to determine a quantity M of values that meet the second condition in the plurality of values as the quantity of passive inter-modulation sources, the values that meet the second condition are greater than a second preset threshold, and the quantity M is an integer greater than or equal to 0.

Optionally, the interference signal includes a noise signal, and the second preset threshold is related to noise power of the noise signal.

An eighth aspect of at least one embodiment provides a communication apparatus. The communication apparatus includes a processor and a memory. The processor is coupled to the memory. The memory is configured to store a program or instructions executed by the processor, or store input data used by the processor to run the instructions, or store data generated after the processor runs the instructions. In response to the program or the instructions being executed by the processor, the communication apparatus is enabled to perform the method in the first aspect or at least one embodiment of the first aspect. Optionally, the communication apparatus further includes an interface, and the processor is coupled to the interface. The interface is configured to communicate with another device. The interface is a transceiver or an input/output interface. The interface is, for example, an interface circuit.

A ninth aspect of at least one embodiment provides a computer-readable storage medium on which instructions are stored. In response to the instructions being run on a computer, the computer is enabled to perform the method in the first aspect or at least one embodiment of the first aspect.

A tenth aspect of at least one embodiment provides a chip system. The chip system includes at least one processor and an interface. The interface is configured to receive data and/or a signal, and the at least one processor is configured to support a computer device to implement a function involved in the first aspect or at least one embodiment of the first aspect. In at least one embodiment, the chip system further includes a memory. The memory is configured to store program instructions and data that are used by the computer device. The chip system is composed of chips, and includes a chip and another discrete device.

An eleventh aspect of at least one embodiment provides a computer program product on which a computer program is stored. In response to the computer program being executed, the method in the first aspect or at least one embodiment of the first aspect is implemented.

BRIEF DESCRIPTION OF DRAWINGS

FIG. 1 is a schematic diagram of a framework of a multi-antenna device;

FIG. 2 to FIG. 6 are schematic diagrams of several embodiments of a method for determining a quantity of passive inter-modulation sources according to at least one embodiment;

FIG. 9 is a schematic diagram of an embodiment of a multi-antenna device inspection method according to at least one embodiment;

FIG. 10 is a schematic diagram of an embodiment of a passive inter-modulation source positioning method according to at least one embodiment;

FIG. 11 is a schematic diagram of an embodiment of a passive inter-modulation source mitigation method according to at least one embodiment;

FIG. 12 is a schematic diagram of an embodiment of an inspection method for mitigating a passive inter-modulation source according to at least one embodiment;

FIG. 13 is a schematic diagram of a structure of an apparatus for determining a quantity of passive inter-modulation sources according to at least one embodiment.

DESCRIPTION OF EMBODIMENTS

Figures 5, 6:
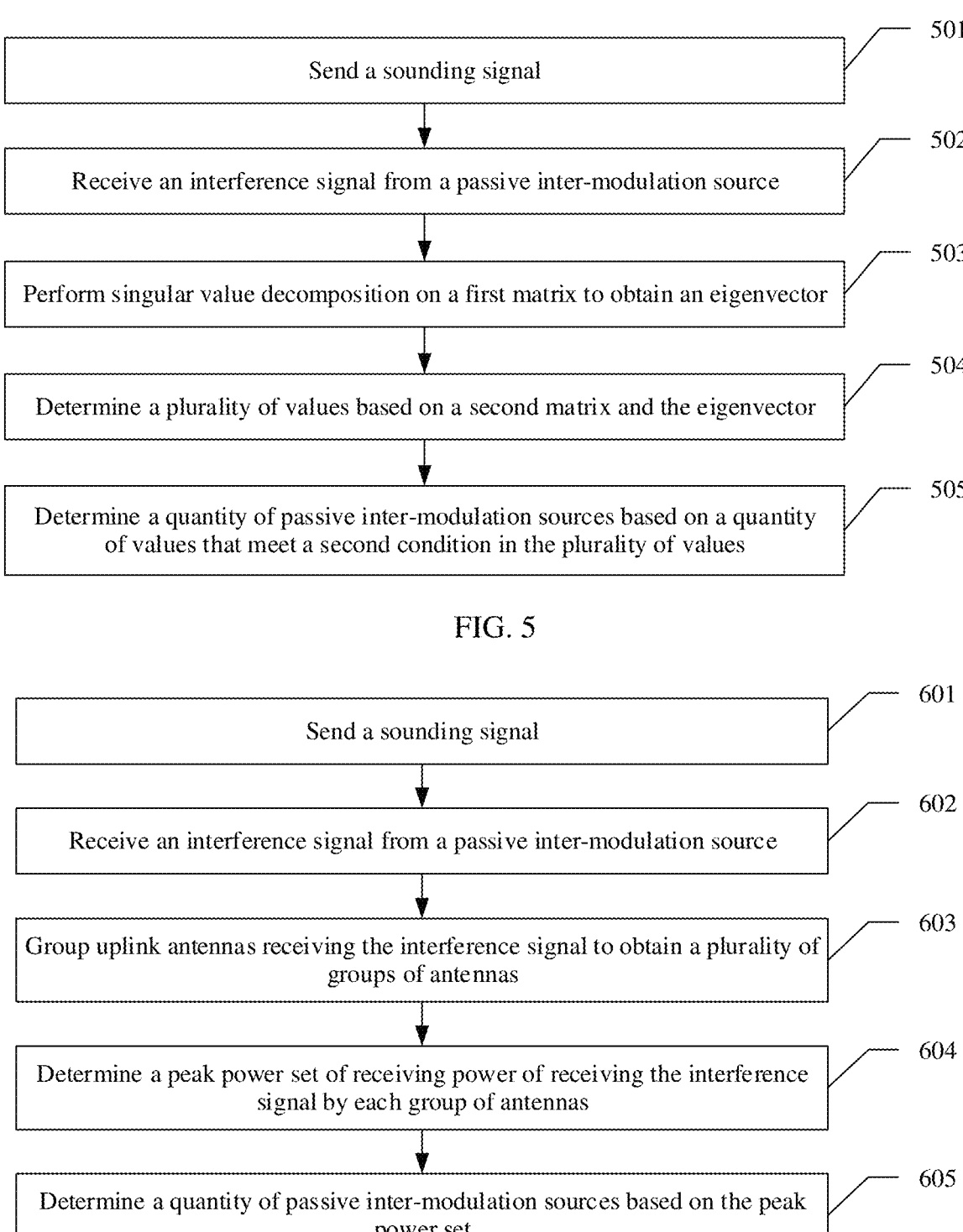

The following describes embodiments with reference to accompanying drawings. The described embodiments are merely some but not all embodiments described herein. A person of ordinary skill in the art learns that, with technology development and emergence of a new scenario, embodiments described herein are also applicable to a similar technical problem.

In at least one embodiment, claims, and accompanying drawings, the terms "first", "second", and the like are intended to distinguish between similar objects but do not necessarily indicate a specific order or sequence. The terms used in such a way are interchangeable in proper circumstances, so that embodiments described herein is implemented in other orders than the order illustrated or described herein. Moreover, the terms "include", "contain" and any variant thereof are intended to cover a non-exclusive inclusion. For example, a process, method, system, product, or device that includes a list of steps or units is not necessarily limited to those steps or units that are expressly listed, but includes other steps or units not expressly listed or are inherent to the process, method, product, or device.

The specific term "example" herein means "used as an example, embodiment or illustration". Any embodiment described as an "example" is not necessarily explained as being superior or better than other embodiments.

In addition, to better describe at least one embodiment, numerous specific details are given in the following specific implementations. A person skilled in the art should understand that at least one embodiment is also implemented without some specific details. In some embodiments, methods, means, elements and circuits that are well-known to a person skilled in the art are not described in detail, so that the subject matter of at least one embodiment is highlighted.

Embodiments described herein provide a method for determining a quantity of passive inter-modulation sources, to conveniently, accurately, and securely detect information about a quantity of multi-channel passive inter-modulation sources. Embodiments described herein further provide a corresponding apparatus, a communication apparatus, a computer-readable storage medium, a computer program product, a chip system, and the like. Details are separately described in the following.

A multi-antenna device is also referred to as a multi-channel device, and is a base station, a mobile terminal, or another wireless communication device having a plurality of antennas. Specifically, the multi-antenna device includes a plurality of antennas, an active antenna processing unit (active antenna unit, AAU), a remote radio unit (remote radio unit, RRU), a baseband unit (baseband unit, BBU), and the like. More specifically, the multi-antenna device is of an antenna-RRU-BBU architecture. The antenna emits a radio frequency signal, the RRU completes signal conversion and transmission between the antenna and the BBU, and the BBU processes a baseband signal. Optionally, the multi-antenna device alternatively is of an AAU-BBU architecture. The AAU includes functions of the antenna and the RRU, and the BBU processes a baseband signal.

In response to passive components, such as a connector, a feeder, an antenna, and a filter, in the multi-antenna device, being used in a condition of a high-power signal of a plurality of frequencies, passive inter-modulation is caused by non-linearity of the components. In this case, a passive inter-modulation signal that interferes with normal operation of the multi-antenna device is generated. These components that generate the passive inter-modulation signal are referred to as passive inter-modulation sources. To eliminate impact of the passive inter-modulation sources, a quantity of passive inter-modulation sources is determined.

As shown in FIG. 1, the multi-antenna device sends a sounding signal. The sounding signal is the high-power signal of the plurality of frequencies. In this case, all passive inter-modulation sources of the multi-antenna device are excited to generate an interference signal, and the multi-antenna device receives the interference signal.

A signal is represented as a matrix. Sometimes, the matrix is considered as a linear transformation, including rotation, scaling, and projection effects. Singular value decomposition (singular value decomposition, SVD) is a destructor for the three effects of the linear transformation, and is specifically to decompose the matrix. Assuming that a matrix A is an m×n matrix, SVD of the matrix A is defined as $A=U\Sigma V^H$, where U is an m×m matrix, and $\Sigma$ is an m×n matrix. Elements other than elements on the main diagonal are 0, and each element on the main diagonal is a singular value. V is an n×n matrix, U and V are both unitary matrices, and H represents conjugate transposition. For the matrix A, a singular value of the matrix A is $\{\lambda_1, \lambda_2, \ldots, \lambda_m\}$, and for a matrix $B=AA^H$, a singular value of the matrix $B=AA^H$ is $$\{\lambda_1^2, \lambda_2^2, \ldots, \lambda_m^2\}.$$

The following describes a method for determining a quantity of passive inter-modulation sources in at least one embodiment with reference to the foregoing architecture of the multi-antenna device and the concept of the singular value decomposition. The method is performed by a multi-antenna device, or is performed by a communication antenna, a processor, a chip, or a chip system of the multi-antenna device, or is implemented by a logic module or software that implements all or some communication functions, control functions, and calculation functions. As shown in FIG. 2, an embodiment of a method for determining a quantity of passive inter-modulation sources according to at least one embodiment includes the following steps.

201: Send a sounding signal.

A multi-antenna device is used as an example. Specifically, the multi-antenna device sends the sounding signal, and the sounding signal is a random signal. More specifically, all carriers that excite passive inter-modulation in the multi-antenna device send the sounding signal.

For example, in a carrier of the multi-antenna device, a sounding signal sent by the carrier is denoted as X, and X is a matrix of $N\times N_{pt1}$, where N is a quantity of transmitting antennas, that is, a quantity of transmitting antennas in the multi-antenna device. In response to X being a frequency domain signal, $N_{pt1}$ is a quantity of subcarriers; or in response to X being a time domain signal, $N_{pt1}$ is a quantity of sampling points. Further, X is a full-rank random signal, or is a multi-stream signal.

202: Receive an interference signal from a passive inter-modulation source.

The multi-antenna device is used as an example. After the multi-antenna device sends the sounding signal, the multi-antenna device receives the interference signal from the passive inter-modulation source, where the interference signal is excited by the sounding signal. Specifically, the interference signal is denoted as Y, and Y is a matrix of $M\times N_{pt2}$, where M is a quantity of receiving antennas, that is, a quantity of receiving antennas in the multi-antenna device. In response to Y being a frequency domain signal, $N_{pt2}$ is a quantity of subcarriers; or in response to Y being a time domain signal, $N_{pt2}$ is a quantity of sampling points. Because the sounding signal is sent by all the carriers in the multi-antenna device that excite passive inter-modulation, the interference signal includes all passive inter-modulation source signals of the multi-antenna device.

For example, in response to the carrier of the multi-antenna device sending a sounding signal whose frequency is $f_1$ and a sounding signal whose frequency is $f_2$, the multi-antenna device receives an interference signal whose frequency is $2f_1-f_2$.

203: Perform singular value decomposition on a first matrix corresponding to the interference signal.

The multi-antenna device is used as an example. After the multi-antenna device obtains the interference signal, the multi-antenna device performs the singular value decomposition on the first matrix, where the first matrix corresponds to the interference signal, that is, the first matrix is a matrix Y of $M\times N_{pt2}$. The singular value decomposition is performed on the first matrix to obtain a result of singular value decomposition.

The first matrix corresponding to the interference signal is also a covariance matrix $$R_{YY} = \frac{1}{N_{pt2}} YY^H$$

of the matrix Y. Because the covariance matrix $R_{YY}$ is a Hermitian matrix, performing the singular value decomposition on $R_{YY}$ is considered as performing eigenvalue decomposition on $R_{YY}$, to obtain a result of the eigenvalue decomposition. That is, in response to the first matrix being a Hermitian matrix, performing the singular value decomposition on the first matrix is considered as performing the eigenvalue decomposition on the first matrix, to obtain the result of the eigenvalue decomposition. The eigenvalue decomposition is considered as a special case of the singular value decomposition. The performing the singular value decomposition is performing the singular value decomposition on the matrix Y, or is performing the singular value decomposition or the eigenvalue decomposition on the covariance matrix of the matrix Y. A person skilled in the art understands that the singular value decomposition includes the foregoing cases, and details are not further described in at least one embodiment.

204: Determine a quantity of passive inter-modulation sources based on the result of the singular value decomposition.

The multi-antenna device is used as an example. After the multi-antenna device obtains the result of the singular value decomposition or the result of the eigenvalue decomposition, the quantity of passive inter-modulation sources is determined based on the result of the singular value decomposition or the result of the eigenvalue decomposition. Specifically, the result of the singular value decomposition is a plurality of singular values, and the result of the eigenvalue decomposition is a plurality of eigenvalues. The multi-antenna device determines the quantity of passive inter-modulation sources based on value change trend of the plurality of singular values or the plurality of eigenvalues.

For example, the result of the singular value decomposition is $\Lambda=\{4, 3, 0.15, 0.1\}$. It is clear that a value change trend of the singular values from 3 to 0.15 increases, and a jump exists. In this case, $\Lambda=\{4, 3\}$ is determined to be the quantity of passive inter-modulation sources, that is, the quantity of passive inter-modulation sources is 2.

In at least one embodiment, the multi-antenna device is controlled to transmit the sounding signal used to excite passive inter-modulation, so that the multi-antenna device receives the interference signal generated based on the sounding signal. Then, the singular value decomposition is performed on the first matrix corresponding to the interference signal. The quantity of passive inter-modulation sources is determined based on the result of the singular value decomposition. In this way, not only information about a quantity of multi-channel passive inter-modulation sources is detected, but also no external device is used, thereby avoiding generation of an additional passive inter-modulation source. No problem is caused even in response to the multi-antenna device is of a closed structure or is used in a high-power scenario, thereby implementing convenient, accurate, and secure detection of the information about the quantity of the multi-channel passive inter-modulation sources.

In at least one embodiment, the singular value decomposition performed on the first matrix corresponding to the interference signal is in a plurality of forms. Details are separately described in the following.

1. Singular value decomposition is directly performed on an interference signal.

As shown in FIG. 3, another embodiment of a method for determining a quantity of passive inter-modulation sources according to at least one embodiment includes the following steps.

301: Send a sounding signal.

302: Receive an interference signal from a passive inter-modulation source.

In at least one embodiment, a user sets a receiving frequency of the multi-antenna device to a specified frequency, that is, the user detects a quantity of passive inter-modulation sources of the specified frequency based on usage by the user. In response to the user mitigating the passive inter-modulation source, the user only mitigates the passive inter-modulation source of the specified frequency. In this case, only the quantity of passive inter-modulation sources of the specified frequency is detected, so that inspection for mitigation is greatly adapted.

303: Perform singular value decomposition on a first matrix corresponding to the interference signal.

304: Determine the quantity of passive inter-modulation sources based on a quantity of singular values that are in a plurality of singular values and that meet a first condition.

A multi-antenna device is used as an example. The multi-antenna device performs the singular value decomposition on the first matrix, and an obtained result of the singular value decomposition includes the plurality of singular values or a plurality of eigenvalues, which is specifically $\Lambda=\{\lambda_1, \ldots, \lambda_M\}$. The user sets the first condition based on usage by the user. The multi-antenna device determines the quantity of passive inter-modulation sources based on the quantity of singular values that meet the first condition in the plurality of singular values.

In at least one embodiment, the singular values that meet the first condition are greater than a first preset threshold, that is, the first condition that is preset by the user in the multi-antenna device is the first preset threshold. The multi-antenna device determines a quantity N of singular values that are in the plurality of singular values and that are greater than the first preset threshold as the quantity of passive inter-modulation sources, where the quantity N is an integer greater than or equal to 0, that is, the quantity of passive inter-modulation sources is an integer greater than or equal to 0.

In at least one embodiment, the interference signal includes a noise signal, and the first preset threshold is related to noise power of the noise signal. Specifically, the interference signal received by the multi-antenna device includes all passive inter-modulation source signals and the noise signal of the multi-antenna device. To eliminate interference of the noise signal, the multi-antenna device generates the first preset threshold based on the power of the noise signal. After the multi-antenna device obtains a plurality of singular values or a plurality of eigenvalues $\Lambda=\{\lambda_1, \ldots, \lambda_M\}$, the multi-antenna device obtains, from the plurality of singular values or the plurality of eigenvalues, a singular value or an eigenvalue that is greater than the first preset threshold. A quantity of singular values or eigenvalues that are greater than the first preset threshold is determined as the quantity of passive inter-modulation sources of the multi-antenna device.

For example, the first matrix corresponding to the interference signal is Y, the singular value decomposition is performed on the first matrix to obtain a plurality of singular values $\Lambda_1=\{2, \sqrt{3}, \sqrt{2}, 1\}$, a first preset threshold Th is generated based on the power of the noise signal, and the first preset threshold $Th=\sqrt{2}$. Therefore, there are two singular values that are greater than the first preset threshold, that is, the quantity of passive inter-modulation sources of the multi-antenna device is 2.

For example, the first matrix corresponding to the interference signal is a covariance matrix $$R_{YY} = \frac{1}{N_{pt2}} YY^H$$

of the matrix Y, $R_{YY}$ is a Hermitian matrix, the singular value decomposition is performed on the first matrix to obtain a plurality of singular values $\Lambda_3=\{4, 3, 2, 1\}$, the first preset threshold Th is generated based on the power of the noise signal, and the first preset threshold $Th=2$. Therefore, there are two singular values that are greater than the first preset threshold, that is, the quantity of passive inter-modulation sources of the multi-antenna device is 2.

For example, the first matrix corresponding to the interference signal is the covariance matrix $$R_{YY} = \frac{1}{N_{pt2}} YY^H$$

of the matrix Y, $R_{YY}$ is a Hermitian matrix, eigenvalue decomposition is performed on the first matrix to obtain a plurality of eigenvalues $\Lambda_3=\{1, 2, 3, 4\}$, the first preset threshold Th is generated based on the power of the noise signal, and the first preset threshold $Th=2$. Therefore, there are two eigenvalues that are greater than the first preset threshold, that is, the quantity of passive inter-modulation sources of the multi-antenna device is 2.

In response to the first matrix being the matrix Y, the singular value of the first matrix is $\lambda(Y)=\{\lambda_1, \lambda_2, \ldots, \lambda_M\}$, and in response to the first matrix being the covariance matrix $$R_{YY} = \frac{1}{N_{pt2}} YY^H$$

of the matrix Y, the singular value of the first matrix is $$\lambda(R_{YY}) = \frac{1}{N_{pt2}}\lambda(Y)^2 = \left\{\frac{\lambda_1^2}{N_{pt2}}, \frac{\lambda_2^2}{N_{pt2}}, \ldots, \frac{\lambda_M^2}{N_{pt2}}\right\}.$$

Therefore, the first preset threshold also is to be adaptively adjusted for a case in which the first matrix is the matrix Y or the matrix $R_{YY}$.

For example, the noise signal is a matrix C of $M \times N_{pt}$, the noise power of the noise signal is P. In response to an average value of the plurality of singular values obtained by performing the singular value decomposition on the matrix C being about $\sqrt{N_{pt}} \times \sqrt{P}$, an average value of the plurality of singular values obtained by performing the singular value decomposition on the matrix $$\frac{1}{\sqrt{N_{pt}}} C$$

is about $\sqrt{P}$, and an average value of the plurality of singular values obtained by performing the singular value decomposition on a covariance matrix $$R_{cc} = \frac{1}{N_{pt}} CC^H$$

of the matrix C is about P. In response to the first matrix being the matrix Y, the first preset threshold is set to $\sqrt{N_{pt2}} \times \sqrt{P}$ or slightly greater than $\sqrt{N_{pt2}} \times \sqrt{P}$, or in response to the first matrix being the covariance matrix $$R_{YY} = \frac{1}{N_{pt2}} YY^H$$

of the matrix Y, the first preset threshold is set to P or slightly greater than P.

In at least one embodiment, the quantity of passive inter-modulation sources is determined based on the quantity of singular values that meet the first condition in the plurality of singular values. The first condition is set based on usage by a user. For example, the first preset threshold is generated based on the power of the noise signal, and the quantity of singular values that meet the first condition is determined as the quantity of passive inter-modulation sources. In this way, interference of the noise signal is eliminated, and a passive inter-modulation source whose power is lower than the power of the noise signal is not considered, thereby meeting the usage by the user while improving implementability of at least one embodiment.

2. Singular value decomposition is performed on some interference signals.

As shown in FIG. 4, another embodiment of a method for determining a quantity of passive inter-modulation sources according to at least one embodiment includes the following steps.

401: Send a sounding signal.

402: Receive an interference signal from a passive inter-modulation source.

403: Perform singular value decomposition on a first matrix to obtain an eigenvector.

A multi-antenna device is used as an example. After the multi-antenna device obtains a matrix Y corresponding to the interference signal, the multi-antenna device divides the matrix Y into two parts $Y_1$ and $Y_2$, where $Y_1$ is a matrix of $M \times N_{Y_1}$, and $Y_2$ is a matrix of $M \times N_{Y_2}$. Specifically, a manner of dividing the matrix Y into two parts includes but is not limited to the following.

Manner 1: Be divided by interval. One column is selected every N+1 column to be divided into $Y_1$, and the rest is divided into $Y_2$, or one column is selected every N+1 column to be divided into Y2, and the rest is divided into Y1. For example, an odd-numbered column of Y is divided into $Y_1$, and an even-numbered column of Y is divided into $Y_2$.

Manner 2: Be divided by order. The first N columns are divided into $Y_1$, and the last $N_{pt2}$–N columns are divided into $Y_2$, or the first N columns are divided into Y2, and the last NPT2–N columns are divided into Y1.

Manner 3: Be randomly divided. N columns are randomly selected to be divided into $Y_1$, and the rest are divided into $Y_2$, or N columns are randomly selected to be divided into Y2, and the rest are divided into Y1.

In this case, the first matrix is a matrix or a covariance matrix corresponding to the some interference signals in interference signals, that is, the first matrix is $Y_1$ or $$R_{Y_1 Y_1} = \frac{1}{N_{Y_1}} Y_1 Y_1^H.$$

A second matrix is a matrix or a covariance matrix corresponding to an interference signal other than the some interference signals in the interference signals, that is, the second matrix is $Y_2$ or $$R_{Y_2 Y_2} = \frac{1}{N_{Y_2}} Y_2 Y_2^H.$$

The multi-antenna device performs the singular value decomposition on the first matrix to obtain the eigenvector. For example, the singular value decomposition, that is, eigenvalue decomposition, is performed on a covariance matrix $$R_{Y_1 Y_1} = \frac{1}{N_{Y_1}} Y_1 Y_1^H$$

of $Y_1$, that is, the first matrix, where [U, S, V]=SVD($R_{Y_1 Y_1}$), to obtain eigenvectors U and V.

404: Determine a quantity of passive inter-modulation sources based on the second matrix and the eigenvector.

After the multi-antenna device obtains the eigenvectors U and V, the multi-antenna device determines the quantity of passive inter-modulation sources in the multi-antenna device based on the second matrix, the eigenvector U and the eigenvector V.

In at least one embodiment, the multi-antenna device further performs the singular value decomposition on the some interference signals, thereby improving selectability and implementability of at least one embodiment.

As shown in FIG. 5, another embodiment of a method for determining a quantity of passive inter-modulation sources according to at least one embodiment includes the following steps.

501: Send a sounding signal.

502: Receive an interference signal from a passive inter-modulation source.

503: Perform singular value decomposition on a first matrix to obtain an eigenvector.

504: Determine a plurality of values based on a second matrix and the eigenvector.

A multi-antenna device is used as an example. After the multi-antenna device obtains a second matrix $Y_2$, eigenvectors U and V, the multi-antenna device determines the plurality of values.

For example, the multi-antenna device projects a covariance matrix $$R_{Y_2 Y_2} = \frac{1}{N_{Y_2}} Y_2 Y_2^H$$

of $Y_2$, that is, the second matrix, on the eigenvector U and the eigenvector V, to obtain a diagonal element, that is $\Lambda = \{\lambda_1, \ldots, \lambda_M\} = \mathrm{diag}(U^H R_{Y_2 Y_2} V)$, thereby determining a set $\Lambda$ of the plurality of values, where a unit of each value $\lambda$ is the same as a unit of power.

505: Determine the quantity of passive inter-modulation sources based on a quantity of values that meet a second condition in the plurality of values.

The multi-antenna device performs the singular value decomposition on the first matrix to obtain the eigenvector, and the plurality of values are determined based on the second matrix and the eigenvector, which is specifically $\Lambda = \{\lambda_1, \ldots, \lambda_M\}$. A user sets a first condition based on usage by the user. The multi-antenna device determines the quantity of passive inter-modulation sources based on the quantity of values that meet the second condition in the plurality of values.

In at least one embodiment, the values that meet the second condition are greater than a second preset threshold, that is, the second condition that is preset by the user in the multi-antenna device is the second preset threshold. The multi-antenna device determines a quantity M of values that are in the plurality of values and that are greater than the second preset threshold as the quantity of passive inter-modulation sources, where the quantity M is an integer greater than or equal to 0, that is, the quantity of passive inter-modulation sources is an integer greater than or equal to 0.

In at least one embodiment, the interference signal includes a noise signal, and the second preset threshold is related to noise power of the noise signal. Specifically, the interference signal received by the multi-antenna device includes all passive inter-modulation source signals and the noise signal of the multi-antenna device. To eliminate interference of the noise signal, the multi-antenna device generates the second preset threshold based on the power of the noise signal. After the multi-antenna device obtains a plurality of values $\Lambda = \{\lambda_1, \ldots, \lambda_M\}$, the multi-antenna device obtains, from a plurality of singular values or a plurality of eigenvalues, singular values or eigenvalues that are greater than the first preset threshold. A quantity of singular values or eigenvalues that are greater than the first preset threshold is determined as the quantity of passive inter-modulation sources of the multi-antenna device.

For example, a set of the plurality of values is $\Lambda = \{4, 3, 2, 1\}$, the second preset threshold Th is generated based on the power of the noise signal, and the second preset threshold is Th=2. Therefore, there are two singular values that are greater than the second preset threshold, that is, the quantity of passive inter-modulation sources of the multi-antenna device is 2.

In at least one embodiment, matrices corresponding to an interference signal are divided into the first matrix and the second matrix, so that the singular value decomposition is performed on the first matrix to obtain the eigenvector. The plurality of values are determined based on the second matrix and the eigenvector, and the quantity of passive inter-modulation sources is determined based on the quantity of values that meet the second condition in the plurality of values. The second condition is set based on usage by a user. For example, the second preset threshold is generated based on the power of the noise signal, and the quantity of singular values that meet the second condition is determined as the quantity of passive inter-modulation sources. In this way, interference of the noise signal is eliminated, and a passive inter-modulation source whose power is lower than the power of the noise signal is not considered, thereby meeting the usage by the user while improving implementability of at least one embodiment.

As shown in FIG. 6, at least one embodiment further provides a method for determining a quantity of passive inter-modulation sources. The method specifically includes the following steps.

601: Send a sounding signal.

602: Receive an interference signal from a passive inter-modulation source.

For an understanding of an implementation of sending the sounding signal and receiving the interference signal in at least one embodiment, refer to corresponding content in the embodiments of the method for determining a quantity of passive inter-modulation sources in FIG. 2 to FIG. 5. Details are not described herein again.

603: Group antennas receiving the interference signal to obtain a plurality of groups of antennas.

Figure 7:
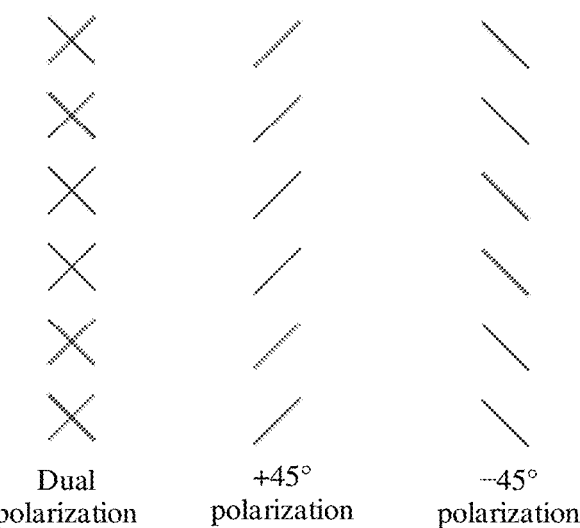
FIG. 7 is a schematic diagram of a structure of an antenna in a multi-antenna device according to at least one embodiment.
Figure 8:
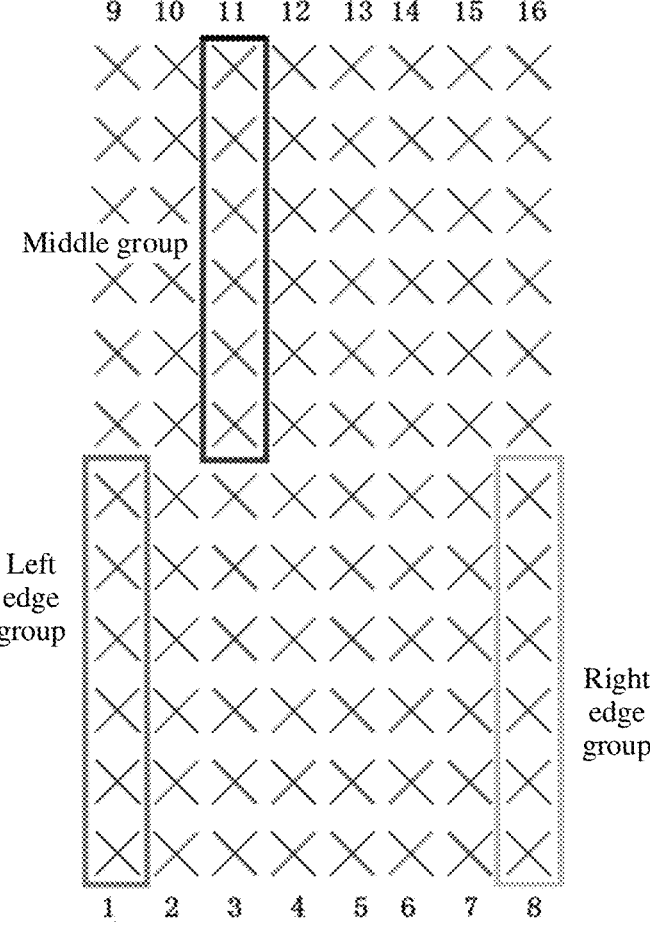
FIG. 8 is a schematic diagram of another structure of an antenna in a multi-antenna device according to at least one embodiment.

For example, as shown in FIG. 7, a multi-antenna device includes an antenna group, that is, a plurality of antennas. One antenna is a 1-to-6 antenna, and is specifically a +45° polarized antenna or a −45° polarized antenna. Two antennas with different polarization exist at a same position to form a dual-polarized antenna, and the dual-polarized antenna is considered as a group of antennas. As shown in FIG. 8, the antenna group of the multi-antenna device includes 16 groups of dual-polarized antennas, but an up-down scale is far greater than a left-right scale. Therefore, the antenna group is to be decoupled in uplink and downlink, and regrouped to obtain 32 groups of dual-polarized antennas. The lower eight groups of antennas are denoted as 1, 2, 3, 4, 5, 6, 7, and 8, and the upper eight groups of antennas are denoted as 9, 10, 11, 12, 13, 14, 15, and 16. The antenna group 1 and the antenna group 9 are left edge groups, the antenna group 8 and the antenna group 16 are right edge groups, and other antenna groups are middle groups.

604: Determine a peak power set of receiving power of receiving an interference signal by each group of antennas.

Because each group of antennas includes two antennas with different polarization, first, receiving power of each group of antennas is to be determined. Optionally, an average value of receiving power of all antennas in the group, that is, the receiving power $$P(i) = \frac{1}{N_0} \sum_{j=1}^{N_0} P(i, j)$$

of receiving the interference signal by each group of antennas, where $P(i,j)$ represents receiving power of the $j^{th}$ antenna in the $i^{th}$ group of antennas, j is a serial number of antennas in the group, and $N_0$ is a quantity of antennas in the group. Optionally, a maximum value of the receiving power in the group is obtained, that is, $$P(i) = \max_j \{P(i, j)\}.$$

In response to the upper and lower antennas not being formed by the dual-polarized antennas, that is, only one antenna exists at a same position, and a quantity of antennas and a quantity of groups being the same, the receiving power of the antennas is the receiving power of the group of antennas.

In response to the peak power set being obtained, $P(i)$ is arranged based on a structure of an antenna array. All peaks of $\{P(i), i=1, \ldots, N_{set}\}$ are found out, and are denoted as a peak power set $\Lambda=\{P_{peak}(i), i=1, \ldots, N_{set}\}$, where is $N_{set}$ a quantity of antenna groups, and $P_{peak}$ is a power peak.

For example, also with reference to FIG. 8, 0 is added to the left side of power of a left antenna group, and 0 is added to the right side of power of a right antenna group, that is, a peak value of an array $[0, P(1), \ldots, P(8), 0]$ and a peak value of an array $[0, P(9), \ldots, P(16), 0]$ are obtained, and peak values of the two arrays are combined and denoted as a peak value set $\Lambda=\{P_{peak}(i), i=1, \ldots, N_{set}\}$.

605: Determine the quantity of passive inter-modulation sources based on the peak power set.

For an understanding of determining the quantity of passive inter-modulation sources based on the set in at least one embodiment, refer to corresponding content in the embodiments of the method for determining the quantity of passive inter-modulation sources in FIG. 2 to FIG. 5. Details are not described herein again.

As shown in FIG. 9, at least one embodiment further provides a multi-antenna device inspection method. The method specifically includes the following steps.

901: Obtain a quantity of passive inter-modulation sources.

902: Obtain a passive inter-modulation indicator of a multi-antenna device.

903: Determine whether the quantity of passive inter-modulation sources meets the passive inter-modulation indicator.

904: In response to the quantity of passive inter-modulation sources meeting the passive inter-modulation indicator, determine that the multi-antenna device is qualified.

In response to the multi-antenna device product being delivered from a factory, the multi-antenna device is inspected. Specifically, the quantity of passive inter-modulation sources is obtained according to the method for determining the quantity of passive inter-modulation sources described in the embodiments of FIG. 2 to FIG. 8 in at least one embodiment, and the passive inter-modulation indicator is obtained. For example, in response to the quantity of passive inter-modulation sources being 1, and the passive inter-modulation indicator of the multi-antenna device is that the quantity of passive inter-modulation sources being less than 2, the quantity of passive inter-modulation sources is determined to meet the passive inter-modulation indicator, thereby determining that the multi-antenna device is qualified.

In at least one embodiment, the quantity of passive inter-modulation sources is obtained according to the method for determining the quantity of passive inter-modulation sources described in the embodiments of FIG. 2 to FIG. 8 in at least one embodiment. A delivery inspection on the multi-antenna device is performed based on the quantity of passive inter-modulation sources, so that the passive inter-modulation indicator of the multi-antenna device is conveniently, accurately, and securely inspected.

As shown in FIG. 10, at least one embodiment further provides a passive inter-modulation source positioning method. The method specifically includes the following steps.

1001: Obtain a quantity of passive inter-modulation sources.

1002: Position a passive inter-modulation source of a multi-antenna device based on the quantity of passive inter-modulation sources.

In response to the passive inter-modulation source of the multi-antenna device being positioned, the quantity of passive inter-modulation sources of the multi-antenna device is to be first obtained. In this case, not only positioning is convenient, but also positioning accuracy is verified. The quantity of passive inter-modulation sources is obtained according to the method for determining the quantity of passive inter-modulation sources described in the embodiments of FIG. 2 to FIG. 8 in at least one embodiment. Passive inter-modulation source positioning on the multi-antenna device is performed based on the quantity of passive inter-modulation sources, so that the passive inter-modulation source of the multi-antenna device is conveniently, accurately, and securely positioned.

As shown in FIG. 11, at least one embodiment further provides a passive inter-modulation source mitigation method. The method specifically includes the following steps.

1101: Obtain a quantity of passive inter-modulation sources.

1102: Mitigate a passive inter-modulation source of a multi-antenna device based on the quantity of passive inter-modulation sources.

In response to the passive inter-modulation source of the multi-antenna device being mitigated, the quantity of passive inter-modulation sources of the multi-antenna device is to be first obtained. In this case, not only mitigating is convenient, but also a mitigation success rate is inspected. The quantity of passive inter-modulation sources is obtained according to the method for determining the quantity of passive inter-modulation sources described in the embodiments of FIG. 2 to FIG. 8 in at least one embodiment. Passive inter-modulation source mitigation on the multi-antenna device is performed based on the quantity of passive inter-modulation sources, so that the passive inter-modulation sources of the multi-antenna device is conveniently, accurately, and securely mitigated.

As shown in FIG. 12, at least one embodiment further provides an inspection method for mitigating a passive inter-modulation source. The method specifically includes the following steps.

1201: Obtain a first quantity of passive inter-modulation sources.

1202: Mitigate a second quantity of passive inter-modulation sources of a multi-antenna device.

1203: Obtain a third quantity of passive inter-modulation sources of the multi-antenna device after mitigation.

1204: Determine whether the third quantity is equal to a difference between the first quantity and the second quantity.

1205: In response to the third quantity being equal to the difference between the first quantity and the second quantity, determine that the passive inter-modulation source is successfully mitigated.

In response to the passive inter-modulation source of the multi-antenna device being mitigated, the first quantity of passive inter-modulation sources is first obtained according to the method for determining the quantity of passive inter-modulation sources described in the embodiments of FIG. 2 to FIG. 8 in at least one embodiment. Then the second quantity of passive inter-modulation sources is mitigated for the multi-antenna device, and the third quantity of passive inter-modulation sources of the multi-antenna device after mitigation is obtained according to the method for determining the quantity of passive inter-modulation sources described in the embodiments of FIG. 2 to FIG. 8 in at least one embodiment. Finally, a determination is made whether the third quantity is equal to the difference between the first quantity and the second quantity, and in response to the third quantity being equal to the difference between the first quantity and the second quantity, the passive inter-modulation source is determined to be successfully mitigated.

For example, the quantity of passive inter-modulation sources of the multi-antenna device is first obtained and the quantity is 10. Then eight passive inter-modulation sources of the multi-antenna device are mitigated. After the mitigation, the quantity of passive inter-modulation sources of the multi-antenna device is reobtained and the quantity is 2. In this case, 2=10−8, and the passive inter-modulation source is determined to be successfully mitigated.

In response to mitigation of passive inter-modulation source of the multi-antenna device being inspected, the quantity of passive inter-modulation sources of the multi-antenna device is to be obtained a plurality of times. The quantity of passive inter-modulation sources is obtained according to the method for determining the quantity of passive inter-modulation sources described in the embodiments of FIG. 2 to FIG. 8 in at least one embodiment. Passive inter-modulation source inspection for mitigation on the multi-antenna device is performed based on the quantity of passive inter-modulation sources, so that effect of mitigating the passive inter-modulation source of the multi-antenna device is conveniently, accurately, and securely inspected.

The following describes an apparatus for determining a quantity of passive inter-modulation sources in at least one embodiment. FIG. 13 is a schematic diagram of an apparatus for determining a quantity of passive inter-modulation sources according to at least one embodiment. The apparatus for determining the quantity of passive inter-modulation sources is configured to implement steps corresponding to a multi-antenna device in the foregoing embodiments. As shown in FIG. 13, the apparatus 1300 for determining the quantity of passive inter-modulation sources includes a transceiver unit 1310 and a processing unit 1320.

In an embodiment, the apparatus 1300 for determining the quantity of passive inter-modulation sources is configured to implement steps corresponding to the multi-antenna device in the foregoing embodiments.

The transceiver unit 1310 is configured to send a sounding signal. The transceiver unit 1310 is further configured to receive an interference signal from a passive inter-modulation source, where the interference signal is excited by the sounding signal. The transceiver unit 1310 performs step 201 and step 202 in the foregoing method embodiments.

The processing unit 1320 is configured to perform singular value decomposition on a first matrix corresponding to the interference signal. The processing unit 1320 is further configured to determine a quantity of passive inter-modulation sources based on a result of the singular value decomposition. The processing unit 1320 performs step 203 and step 204 in the foregoing method embodiments.

In at least one embodiment, the transceiver unit 1310 is controlled to transmit the sounding signal used to excite passive inter-modulation, so that the transceiver unit 1310 receives the interference signal generated based on the sounding signal. Then, the processing unit 1320 performs the singular value decomposition on the first matrix corresponding to the interference signal. The processing unit 1320 further determines the quantity of passive inter-modulation sources based on the result of the singular value decomposition. In this way, not only information about a quantity of multi-channel passive inter-modulation sources is detected, but also no external device is used, thereby avoiding generation of an additional passive inter-modulation source. No problem is caused even in response to the multi-antenna device being a closed structure or being used in a high-power scenario, thereby implementing convenient, accurate, and secure detection of the information about the quantity of the multi-channel passive inter-modulation sources.

Optionally, the result of the singular value decomposition includes a plurality of singular values, and the processing unit 1320 is specifically configured to determine the quantity of passive inter-modulation sources based on a quantity of singular values that meet a first condition in the plurality of singular values.

Optionally, the processing unit 1320 is further specifically configured to determine a quantity N of singular values that meet the first condition in the plurality of singular values as the quantity of passive inter-modulation sources, the singular values that meet the first condition are greater than a first preset threshold, and the quantity N is an integer greater than or equal to 0.

Optionally, the interference signal includes a noise signal, and a preset threshold is generated based on noise power of the noise signal.

Optionally, the first matrix is a matrix or a covariance matrix corresponding to some interference signals in interference signals, and the processing unit 1320 is further specifically configured to perform the singular value decomposition on the first matrix to obtain an eigenvector.

The processing unit 1320 is further specifically configured to determine the quantity of passive inter-modulation sources based on a second matrix and the eigenvector, and the second matrix is a matrix or a covariance matrix corresponding to an interference signal other than the some interference signals in the interference signals.

Optionally, the processing unit 1320 is further specifically configured to determine a plurality of values based on the second matrix and the eigenvector.

The processing unit 1320 is further specifically configured to determine the quantity of passive inter-modulation sources based on a quantity of values that meet the second condition in the plurality of values.

Optionally, the processing unit 1320 is further specifically configured to determine a quantity M of values that meet the second condition in the plurality of values as the quantity of passive inter-modulation sources, the values that meet the second condition are greater than a second preset threshold, and the quantity M is an integer greater than or equal to 0.

Optionally, the interference signal includes a noise signal, and the second preset threshold is related to noise power of the noise signal.

For an understanding of the apparatus 1300 for determining the quantity of passive inter-modulation sources in at least one embodiment, refer to corresponding content in the foregoing method embodiments for determining the quantity of passive inter-modulation sources. Details are not described herein again.

Optionally, the apparatus 1300 for determining the quantity of passive inter-modulation sources further includes a storage unit. The storage unit is configured to store data or instructions (which is also referred to as code or a program). The foregoing units interact with or be coupled to the storage unit, to implement a corresponding method or function. For example, the processing unit 1320 reads the data or the instructions in the storage unit, so that the apparatus 1300 for determining the quantity of passive inter-modulation sources implements the methods in the foregoing embodiments.

Divisions of units in the foregoing apparatus 1300 for determining the quantity of passive inter-modulation sources is merely logical function division. During actual implementation, all or some of the units is integrated into one physical entity, or is physically separated. In addition, all the units in the apparatus 1300 for determining the quantity of passive inter-modulation sources is implemented in a form in which a processing element invokes software, or is implemented in a form of hardware; or some units is implemented in a form in which a processing element invokes software, and some units are implemented in a form of hardware. For example, each unit is a separately disposed processing element, or is integrated into a chip of the apparatus 1300 for determining the quantity of passive inter-modulation sources for implementation. In addition, each unit alternatively is stored in a memory in a form of a program to be invoked by a processing element of the apparatus 1300 for determining the quantity of passive inter-modulation sources to perform a function of the unit. In addition, all or some of the units are integrated, or are implemented independently. The processing element herein is also referred to as a processor, and is an integrated circuit having a signal processing capability. During implementation, steps in the foregoing methods or the foregoing units is implemented by using a hardware integrated logic circuit in a processor element, or is implemented in the form of software invoked by the processing element.

In an example, any one of the units in the foregoing apparatus 1300 for determining the quantity of passive inter-modulation sources is one or more integrated circuits configured to implement the foregoing method, for example, one or more application-specific integrated circuits (application-specific integrated circuits, ASICs), or one or more microprocessors (digital signal processors, DSPs), or one or more field programmable gate arrays (field programmable gate arrays, FPGAs), or a combination of at least two of these integrated circuit forms. For another example, in response to the units in the apparatus 1300 for determining the quantity of passive inter-modulation sources being implemented in a form of scheduling a program by a processing element, the processing element is a general-purpose processor, for example, a central processing unit (central processing unit, CPU) or another processor that invokes the program. For still another example, the units is integrated and implemented in a form of a system-on-a-chip (system-on-a-chip, SOC).

Figure 14:
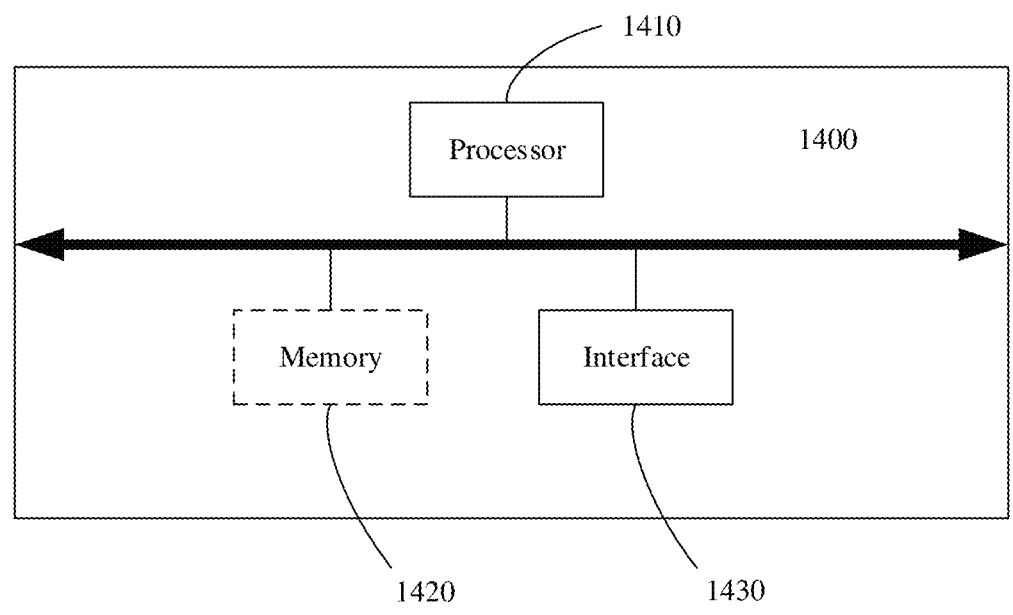
FIG. 14 is a schematic diagram of a structure of a communication apparatus according to at least one embodiment.

FIG. 14 is a schematic diagram of a communication apparatus according to at least one embodiment. The communication apparatus is configured to implement operations of a multi-antenna device in the foregoing embodiments. As shown in FIG. 14, the communication apparatus 1400 includes a processor 1410 and an interface 1430. The processor 1410 is coupled to the interface 1430. The interface 1430 is configured to communicate with another device. The interface 1430 is a transceiver or an input/output interface. The interface 1430 is, for example, an interface circuit. Optionally, the communication apparatus 1400 further includes a memory 1420. The processor 1410 is coupled to the memory 1420. The memory 1420 is configured to store instructions executed by the processor 1410, or store input data used by the processor 1410 to run the instructions, or store data generated after the processor 1410 runs the instructions.

The methods executed by the multi-antenna device in the foregoing embodiments is implemented by the processor 1410 by invoking a program stored in a memory (which is the memory 1420 of the multi-antenna device, or is an external memory). That is, the multi-antenna device includes the processor 1410. The processor 1410 invokes the program in the memory to perform the method performed by the multi-antenna device in the foregoing method embodiments. The processor herein is an integrated circuit having a signal processing capability, for example, a CPU. The multi-antenna device is implemented by being configured to one or more integrated circuits that implement the foregoing methods, for example, one or more ASICs, one or more microprocessors DSPs, one or more FPGAs, or a combination of at least two of the integrated circuit forms. Alternatively, the foregoing implementations is combined.

Specifically, functions/implementation processes of the transceiver unit 1310 and the processing unit 1320 in FIG. 13 is implemented by invoking, by the processor 1410 in the communication apparatus 1400 shown in FIG. 14, computer-executable instructions stored in the memory 1420. Alternatively, functions/implementation processes of the processing unit 1320 in FIG. 13 is implemented by invoking, by the processor 1410 in the communication apparatus 1400 shown in FIG. 14, the computer-executable instructions stored in the memory 1420. Functions/implementation processes of the transceiver unit 1310 in FIG. 13 is implemented by the interface 1430 in the communication apparatus 1400 shown in FIG. 14. For example, the functions/the implementation processes of the transceiver unit 1310 is implemented by invoking, by a processor, program instructions in the memory to drive the interface 1430.

In response to the communication apparatus 1400 being a chip used in a terminal device, the terminal device chip implements a function of the terminal device in the foregoing method embodiments. The terminal device chip receives information from another module (for example, a radio frequency module or an antenna) in the terminal device. The information is from another terminal device or a network device. Alternatively, the terminal device chip sends information to another module (for example, a radio frequency module or an antenna) in the terminal device, where the information is sent by the terminal device to another terminal device or a network device.

In response to the communication apparatus 1400 being a chip used in a network device, the network device chip implements a function of the network device in the foregoing method embodiments. The network device chip receives information from another module (for example, a radio frequency module or an antenna) in the network device, where the information is from another network device or a terminal device. Alternatively, the network device chip sends information to another module (for example, a radio frequency module or an antenna) in the network device. The information is sent by the network device to another network device or a terminal device.

In at least one embodiment, a computer-readable storage medium is further provided. The computer-readable storage medium stores computer-executable instructions. In response to at least one processor of a device executing the computer-executable instructions, the device performs the method for determining a quantity of passive inter-modulation sources described in the embodiments in FIG. 2 to FIG. 5.

In at least one embodiment, a computer program product is further provided. The computer program product includes computer-executable instructions, and the computer-executable instructions are stored in a computer-readable storage medium. At least one processor of a device reads the computer-executable instructions from the computer-readable storage medium, and the at least one processor executes the computer-executable instructions, so that the device performs the method for determining a quantity of passive inter-modulation sources described in the embodiments in FIG. 2 to FIG. 5.

In at least one embodiment, a chip system is further provided. The chip system includes at least one processor and an interface. The interface is configured to receive data and/or a signal. The at least one processor is configured to support to implement the method for determining a quantity of passive inter-modulation sources described in the embodiments in FIG. 2 to FIG. 5. In at least one embodiment, the chip system further includes a memory. The memory is configured to store program instructions and data that are used by a computer device. The chip system is composed of chips, and includes a chip and another discrete device.

A person skilled in the art understands that, for the purpose of convenient and brief description, for a detailed working process of the foregoing systems, apparatuses, and units, refer to a corresponding process in the foregoing method embodiments, and details are not described herein again.

In at least one embodiment, the disclosed systems, apparatuses, and methods is implemented in other manners. For example, the described apparatus embodiments are merely examples. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units is selected based on actual usage to achieve the objectives of at least one embodiment.

In addition, functional units in at least one embodiment is integrated into one processing unit, each of the units exist alone physically, or two or more units are integrated into one unit. The integrated unit is implemented in a form of hardware, or is implemented in a form of a software functional unit.

In response to the integrated unit being implemented in the form of the software functional unit and sold or used as an independent product, the integrated unit is stored in a computer-readable storage medium. Based on such an understanding, at least one embodiment essentially, or the part contributing to a conventional technology, or all or some of the embodiments described herein is implemented in the form of a software product. The computer software product is stored in a storage medium and includes several instructions for instructing a computer device (which is a personal computer, a server, a network device, or the like) to perform all or some of the steps of the methods described in at least one embodiment. The foregoing storage medium includes any medium that stores program code, such as a USB flash drive, a removable hard disk, a read-only memory (ROM, read-only memory), a random access memory (RAM, random access memory), a magnetic disk, or an optical disc.

What is claimed is:

1. A method for determining a quantity of passive inter-modulation sources, comprising:

sending a sounding signal using all carriers in a multi-antenna device to excite passive intermodulation sources of the multi-antenna device to generate an interference signal;

receiving the interference signal from the passive inter-modulation sources, wherein the passive intermodulation sources of the multi-antenna device generate the interference signal based on being excited by the sounding signal using all the carriers in the multi-antenna device;

performing singular value decomposition on a first matrix corresponding to the interference signal; and determining a quantity of the passive inter-modulation sources based on a result of the singular value decomposition, the result of the singular value decomposition being a plurality of singular values and the quantity of the passive inter-modulation sources is based on value change trend of the plurality of singular values.

2. The method according to claim 1, wherein the performing the singular value decomposition produces the plurality of singular values, and the determining the quantity of the passive inter-modulation sources based on the result of the singular value decomposition includes:

determining the quantity of the passive inter-modulation sources based on a quantity of singular values that meet a first condition in the plurality of the singular values.

3. The method according to claim 2, wherein the determining the quantity of the passive inter-modulation sources based on the quantity of the singular values that meet the first condition in the plurality of the singular values includes:

determining a quantity N of singular values that meet the first condition in the plurality of the singular values as the quantity of the passive inter-modulation sources, wherein the singular values that meet the first condition are greater than a first preset threshold, and the quantity N is an integer greater than or equal to 0.

4. The method according to claim 3, wherein the interference signal includes a noise signal, and the first preset threshold is related to noise power of the noise signal.

5. The method according to claim 1, wherein the receiving the interference signal includes receiving a plurality of interference signals and wherein the performing the singular value decomposition on the first matrix corresponding to the interference signal includes performing the singular value decomposition on the first matrix corresponding to a plurality interference signals, wherein the first matrix is a matrix or a covariance matrix corresponding to one or more of the plurality of the interference signals;

wherein the performing the singular value decomposition on the first matrix corresponding to the plurality of the interference signals includes: performing the singular value decomposition on the first matrix to obtain an eigenvector; and wherein the determining the quantity of the passive inter-modulation sources based on the result of the singular value decomposition includes:

determining the quantity of the passive inter-modulation sources based on a second matrix and the eigenvector, wherein the second matrix is a matrix or a covariance matrix corresponding to an interference signal other than the one or more of the interference signals in the plurality of the interference signals.

6. The method according to claim 5, wherein the determining the quantity of the passive inter-modulation sources based on the second matrix and the eigenvector includes:

determining a plurality of values based on the second matrix and the eigenvector; and determining the quantity of the passive inter-modulation sources based on the quantity of values that meet a second condition in the plurality of the values.

7. The method according to claim 6, wherein the determining the quantity of the passive inter-modulation sources based on the quantity of the values that meet the second condition in the plurality of the values includes:

determining a quantity M of the values that meet the second condition in the plurality of the values as the quantity of the passive inter-modulation sources, wherein the values that meet the second condition are greater than a second preset threshold, and the quantity M is an integer greater than or equal to 0.

8. An apparatus, comprising:

memory storing instructions;

one or more processors connected to the memory, wherein the one or more processors are configured to execute instructions to perform operations to:

send a sounding signal using all carriers in a multi-antenna device to excite passive intermodulation sources of the multi-antenna device to generate an interference signal;

receive the interference signal from the passive inter-modulation sources, wherein the passive intermodulation sources of the multi-antenna device generate the interference signal based on being excited by the sounding signal using all the carriers in the multi-antenna device;

perform singular value decomposition on a first matrix corresponding to the interference signal; and determine a quantity of the passive inter-modulation sources based on a result of the singular value decomposition, the result of the singular value decomposition being a plurality of singular values and the quantity of the passive inter-modulation sources is based on value change trend of the plurality of singular values.

9. The apparatus according to claim 8, wherein the result of the singular value decomposition includes the plurality of singular values;

wherein the one or more processors are configured to determine the quantity of the passive inter-modulation sources based on the result of the singular value decomposition by:

determining the quantity of the passive inter-modulation sources based on a quantity of singular values that meet a first condition in the plurality of the singular values.

10. The apparatus according to claim 9, wherein the one or more processors are configured to determine the quantity of the passive inter-modulation sources based on the quantity of the singular values that meet the first condition in the plurality of the singular values by:

determining a quantity N of singular values that meet the first condition in the plurality of the singular values as the quantity of the passive inter-modulation sources, wherein the singular values that meet the first condition are greater than a first preset threshold, and the quantity N is an integer greater than or equal to 0.

11. The apparatus according to claim 10, wherein the interference signal includes a noise signal, and the first preset threshold is related to noise power of the noise signal.

12. The apparatus according to claim 8, wherein the interference signal includes a plurality of interference signals and the first matrix is a matrix or a covariance matrix corresponding to one or more of the plurality of the interference signals;

wherein the one or more processors are configured to perform the singular value decomposition on the first matrix corresponding to the interference signal by:

performing the singular value decomposition on the first matrix to obtain an eigenvector; and determining the quantity of the passive inter-modulation sources based on the result of the singular value decomposition by:

determining the quantity of the passive inter-modulation sources based on a second matrix and the eigenvector, wherein the second matrix is a matrix or a covariance matrix corresponding to an interference signal other than the one or more of the interference signals in the plurality of the interference signals.

13. The apparatus according to claim 12, wherein the one or more processors are configured to determine the quantity of the passive inter-modulation sources based on the second matrix and the eigenvector by:

determining a plurality of values based on the second matrix and the eigenvector; and determining the quantity of the passive inter-modulation sources based on a quantity of values that meet a second condition in the plurality of the values.

14. The apparatus according to claim 13, wherein the one or more processors are configured are configured to determine the quantity of the passive inter-modulation sources based on the quantity of the values that meet the second condition in the plurality of the values by:

determining a quantity M of values that meet the second condition in the plurality of the values as the quantity of the passive inter-modulation sources, wherein the values that meet the second condition are greater than a second preset threshold, and the quantity M is an integer greater than or equal to 0.

15. A non-transitory computer readable medium storing instructions that are executable by a processor, which when executed by the processor causes the processor to perform operations comprising:

sending a sounding signal using all carriers in a multi-antenna device to excite passive intermodulation sources of the multi-antenna device to generate an interference signal;

receiving the interference signal from the passive inter-modulation sources, wherein the passive intermodula-tion sources of the multi-antenna device generate the interference signal based on being excited by the sounding signal using all the carriers in the multi-antenna device;

performing singular value decomposition on a first matrix corresponding to the interference signal; and determining a quantity of the passive inter-modulation sources based on a result of the singular value decom-position, the result of the singular value decomposition being a plurality of singular values and the quantity of the passive inter-modulation sources is based on value change trend of the plurality of singular values.

16. The non-transitory computer readable medium according to claim 15, wherein the performing the singular value decomposition produces the plurality of singular val-ues, and the determining the quantity of the passive inter-modulation sources based on the result of the singular value decomposition includes:

determining the quantity of the passive inter-modulation sources based on a quantity of singular values that meet a first condition in the plurality of the singular values.

17. The non-transitory computer readable medium according to claim 16, wherein the determining the quantity of the passive inter-modulation sources based on the quan-tity of the singular values that meet the first condition in the plurality of the singular values includes:

determining a quantity N of singular values that meet the first condition in the plurality of the singular values as the quantity of the passive inter-modulation sources, wherein the singular values that meet the first condition are greater than a first preset threshold, and the quantity N is an integer greater than or equal to 0.

18. The non-transitory computer readable medium according to claim 17, wherein the interference signal includes a noise signal, and the first preset threshold is related to noise power of the noise signal.

19. The non-transitory computer readable medium according to claim 15, wherein the receiving the interference signal includes receiving a plurality of interference signals and wherein the performing the singular value decomposi-tion on the first matrix corresponding to the interference signal includes performing the singular value decomposition on the first matrix corresponding to a plurality interference signals, wherein the first matrix is a matrix or a covariance matrix corresponding to one or more of the plurality of the interference signals;

wherein the performing the singular value decomposition on the first matrix corresponding to the plurality of the interference signals includes:

performing the singular value decomposition on the first matrix to obtain an eigenvector; and wherein the determining the quantity of the passive inter-modulation sources based on the result of the singular value decomposition includes:

determining the quantity of the passive inter-modulation sources based on the second matrix and the eigenvec-tor, wherein the second matrix is a matrix or a cova-riance matrix corresponding to an interference signal other than the one or more of the interference signals in the plurality of the interference signals.

20. The non-transitory computer readable medium according to claim 19, wherein the determining the quantity of the passive inter-modulation sources based on the second matrix and the eigenvector includes:

determining a plurality of values based on the second matrix and the eigenvector; and determining the quantity of the passive inter-modulation sources based on the quantity of values that meet a second condition in the plurality of the values.

* * * * *